March 31, 1970  J. G. WIATT ET AL  3,503,295
SUPPORT FOR FLEXIBLE TABLE TOP
Original Filed Sept. 7, 1967  3 Sheets-Sheet 1

INVENTORS
JAMES G. WIATT
& EDWARD C. BRUNS
BY
*Frank C. Leach, Jr.*
THEIR ATTORNEY March 31, 1970   J. G. WIATT ET AL   3,503,295
SUPPORT FOR FLEXIBLE TABLE TOP
Original Filed Sept. 7, 1967   3 Sheets-Sheet 3

United States Patent Office 3,503,295
Patented Mar. 31, 1970

3,503,295
SUPPORT FOR FLEXIBLE TABLE TOP
James G. Wiatt and Edward C. Bruns, Cincinnati, Ohio, assignors to The Cincinnati Milling Machine Co., Cincinnati, Ohio, a corporation of Ohio
Continuation of application Ser. No. 666,097, Sept. 7, 1967. This application Jan. 28, 1969, Ser. No. 800,802
Int. Cl. B26d 5/08
U.S. Cl. 83—648                                    11 Claims

ABSTRACT OF THE DISCLOSURE

A material cutting machine has a flexible band upon which material to be cut is supported. The opposite ends of the flexible band are fixedly attached to a fixed support structure whereby the band forms the top of a table. Cutting means is supported on a carriage, which has means cooperating with the flexible band to form a loop in the band into which the cutting means may extend. As the carriage moves longitudinally, the loop in the flexible band moves therewith. One group of rollers is attached to one side of the carriage and extends therefrom to provide support between the one side of the carriage and adjacent one end of the flexible band. A second group of rollers is attached to the other side of the carriage and extends therefrom to provide support between the other side of the carriage and adjacent the other end of the band. Each of the groups of rollers has sufficient length to provide support to substantially the entire length of the band when the carriage is disposed adjacent either end of the table. The two groups of rollers are connected to each other by resilient means. The support structure has means to support shafts of the rollers when the rollers are supporting the band and other means to support the rollers directly when the rollers are not supporting the band and are disposed in areas beneath the band.

---

This is a continuation of application Ser. No. 666,097, filed Sept. 7, 1967, and now abandoned.

In one type of material cutting machine, the material, which is to be cut, is supported on a flexible band having both ends fixed to support structure, which functions as a table. The band, which defines the table top, is threaded through spaced rollers on a carriage to define a loop in the band whereby an aperture or passage is provided in the table top at the carriage. When the carriage, which has cutting means mounted thereon and extending through the aperture or passage in the table top for cutting the material supported on the table top without interference with the table top, is moved longitudinally, the aperture or passage moves therewith.

Since the rollers on the carriage support the flexible band only adjacent the aperture or passage, it is necessary to provide support means for the remainder of the flexible band. This is particularly significant when a heavy load is disposed on the table top. Because of the longitudinal movement of the carriage relative to the band, stationary support rollers or the like may not be employed in a cutting machine having a flexible support band of fixed length since these would interfere with the longitudinal movement of the carriage.

The present invention satisfactorily solves the problem of providing support means to the flexible band substantially throughout its length without interfering with the longitudinal movement of the carriage on which the cutting means is supported. Thus, the present invention permits heavy loads to be cut by a cutting machine having a flexible band of fixed length on which the material is supported with the carriage being movable longitudinal relative thereto.

Accordingly, an object of this invention is to provide a support structure for a flexible band without interference with longitudinal movement of a carriage, which carries the cutting means for cutting material supported on the band, relative to the band.

Another object of this invention is to provide a support structure for firmly supporting portions of a flexible band, which is threaded through a carriage, upon which material may be supported.

Other objects of this invention will be readily perceived from the following description, claims, and drawings.

This invention relates to an apparatus comprising a frame, which carries a flexible band. A plurality of spaced support members is carried by the frame. When operable, the members engage the band to support the band. A carriage is mounted on the frame for movement longitudinally along the frame relative to the band with at least a portion of the carriage extending below the band. The support members are connected to each other by means. Suitable means attach one end of the connecting means to one side of the carriage and the other end of the connecting means to the other side of the carriage.

The attached drawings illustrate a preferred embodiment of the invention, in which FIGURE 1 is a side elevational view, partly broken away, of a material cutting machine having a flexible band supported by the support structure of the present invention;

Figure 1:
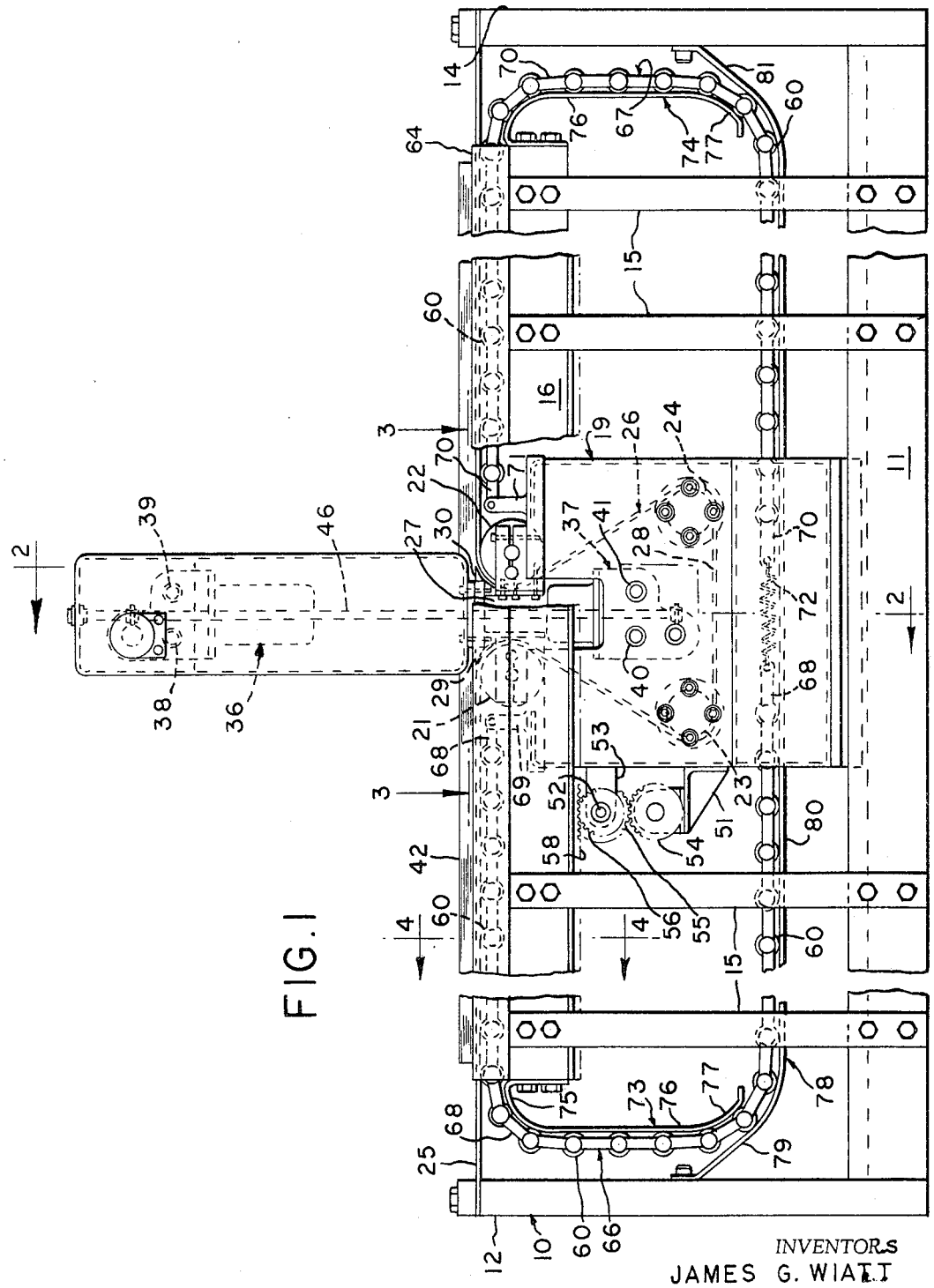
Figure 2:
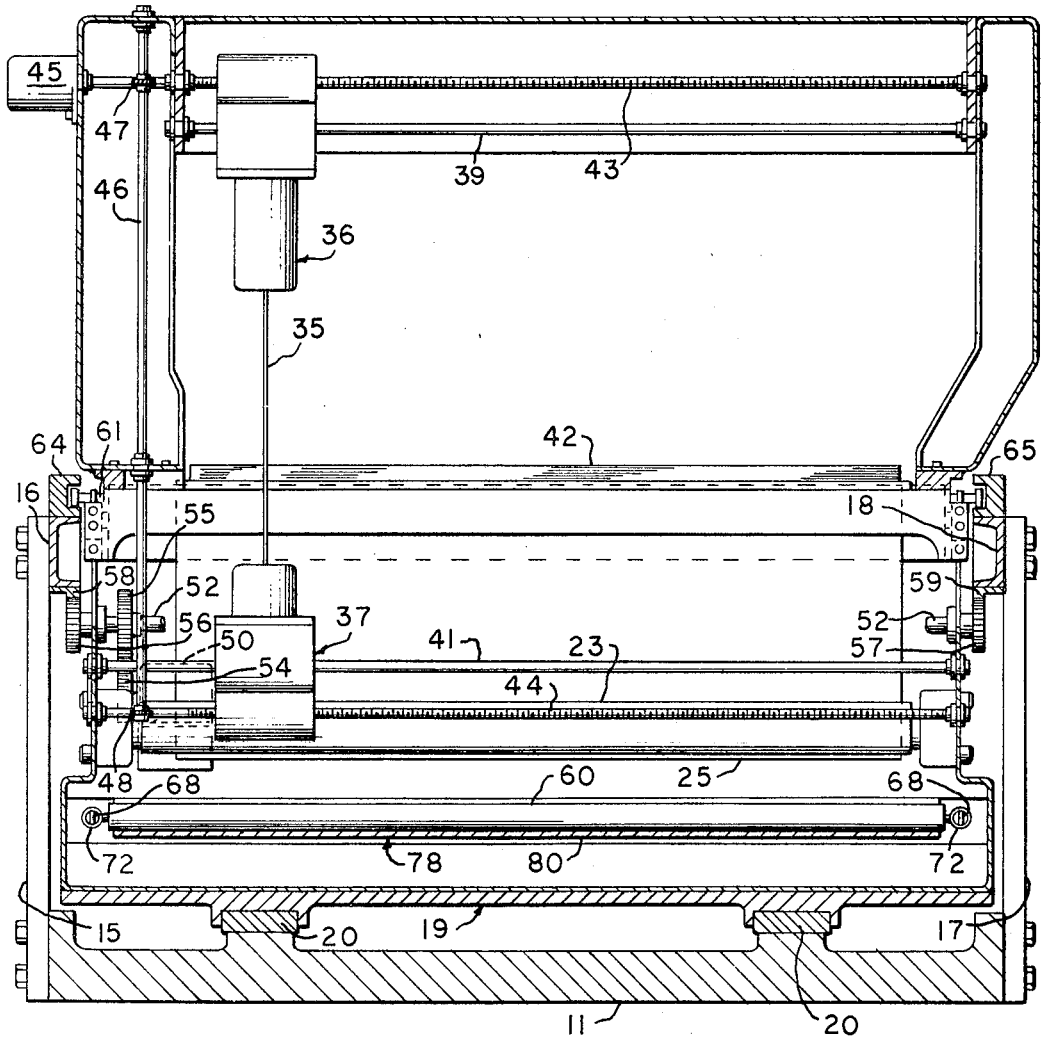
FIGURE 2 is a sectional view of the cutting machine of FIGURE 1 and taken along line 2—2 of FIGURE 1.

Referring to the drawings and particularly FIGURE 1, there is shown an elongated frame 10 having a base 11 and end plates 12 and 14. A plurality of horizontally spaced upstanding standards 15 extends upwardly from the base 11. A side channel 16 is supported at the upper ends of the standards 15 as shown in FIGURES 1 and 2.

A plurality of horizontally spaced upstanding standards 17 (one shown in FIGURE 2) extends from the opposite side of the base 11 from which the standards 15 extend. A side channel 18 (see FIGURE 2) is supported at the upper ends of the standards 17 in the same manner as the side channel 16 is supported by the standards 15 in FIGURE 1.

A carriage 19 is mounted on ways 20 (see FIGURE 2) in the base 11 of the frame 10 for longitudinal movement along the frame 10. The carriage 19 has two upper rolls 21 and 22, which are horizontally spaced from each other, rotatably mounted thereon. The carriage 19 also has two lower rolls 23 and 24, which are spaced further horizontally from each other than the rolls 21 and 22 are horizontally spaced from each other, rotatably mounted thereon.

An elongated flexible band or belt 25 has one end connected to the top of the end plate 12 and its other end secured to the top of the end plate 14. The flexible band or belt 25 may be formed of any suitable material such as leather, fabric, wire mesh, or thin stainless steel, for example.

The band 25, which is longer than the frame 10, passes over the upper rolls 21 and 22 and under the lower rolls 23 and 24 to define a loop 26 at the carriage 19. With the upper rolls 21 and 22 more closely spaced together than the lower rolls 23 and 24, a narrow throat 27 in the loop 26 is defined between the upper rolls 21 and 22 while a broad base 28 is provided between the lower rolls 23 and 24.

Figure 3:
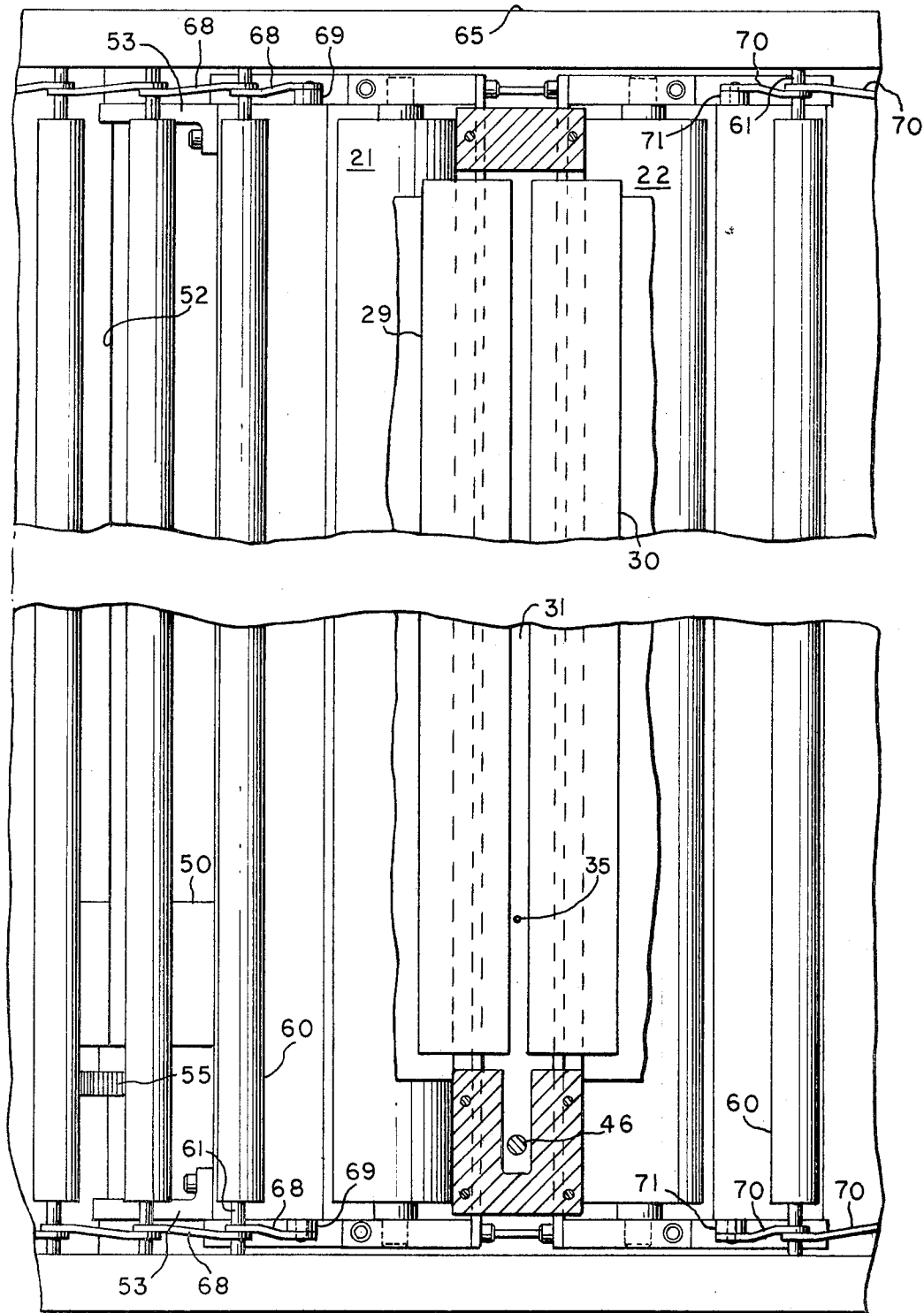
FIGURE 3 is a top plan view, partly in section, of a portion of the structure of FIGURE 1 and taken along line 3—3 of FIGURE 1.

The carriage 19 supports a pair of throat way sections 29 and 30 thereon to reduce the narrow throat 27 to a small, transverse gap 31 (see FIGURE 3). Each of the throat way sections 29 and 30 is beveled (see FIGURE 1) to cooperate with the curved portions of the flexible band 25 passing around the upper rolls 21 and 22.

The carriage 19 has a cutting blade 35 (see FIGURES 2 and 3), which extends through the gap 31, mounted thereon for movement therewith. The cutting blade 35 is adapted to be moved transversely relative to the carriage 19 through the gap 31.

The cutting blade 35 extends between an upper slide 36 and a lower slide 37 (see FIGURE 2). The upper slide 36 is slidably mounted on a pair of parallel shafts 38 and 39 (see FIGURE 1), which extends across the frame 10 above the top of the band 25. The lower slide 37 is slidably supported on a pair of parallel shafts 40 and 41, which extend across the frame 10 below the portion of the band 25 on which material 42 is supported for cutting.

The cutting blade 35 is reciprocated by mechanism (not shown) in the slides 36 and 37. The cutting blade 35 may be circular in cross section and have small barbs (not shown) around its periphery to cut in any direction.

A screw 43 (see FIGURE 2) is threadedly received in the upper slide 36, and a screw 44 is threadedly received in the lower slide 37. The screw 43 is rotated by a reversible motor 45 connected thereto.

A vertical shaft 46 is connected to the upper screw 43 by helical gearing 47 and to the lower screw 44 by helical gearing 48. Thus, the motor 45 drives the screws 43 and 44 in unison in one direction or the other. Accordingly, the slides 36 and 37 move in unison, one above the other, in one direction or the other across the carriage 19.

Longitudinal movement of the carriage 19 on the frame 10 relative to the band 25 is produced by a motor 50 (see FIGURE 2), which is mounted on a bracket 51 (see FIGURE 1) of the carriage 19. The motor 50 rotates a shaft 52, which is rotatably mounted in brackets 53 (one shown in FIGURE 1 and both shown in FIGURE 3) on the carriage 19, through a gear 54 on the motor shaft and a gear 55 on the shaft 52.

The shaft 52 has gears 56 and 57 (see FIGURE 2) attached at its opposite ends for rotation therewith. The gear 56 meshes with a rack 58 connected to the bottom of the side channel 16. The gear 57 meshes with a rack 59 attached to the bottom of the side channel 18.

Accordingly, when the motor 50 is energized, longitudinal movement of the carriage 19 occurs. The direction of movement of the carriage 19 depends on the direction of rotation of the motor 50.

Therefore, the cutting blade 35 may form various desired patterns in the material 42, which is supported on the flexible band 25. The cutting blade 35 is moved longitudinally with the carriage 19 when the motor 50 is rotated while the cutting blade 35 is moved transversely through the gap 31 when the slides 36 and 37 are moved through energization of the motor 45. Thus, universal movement of the cutting blade 35 relative to the material 42 occurs.

Figure 4:
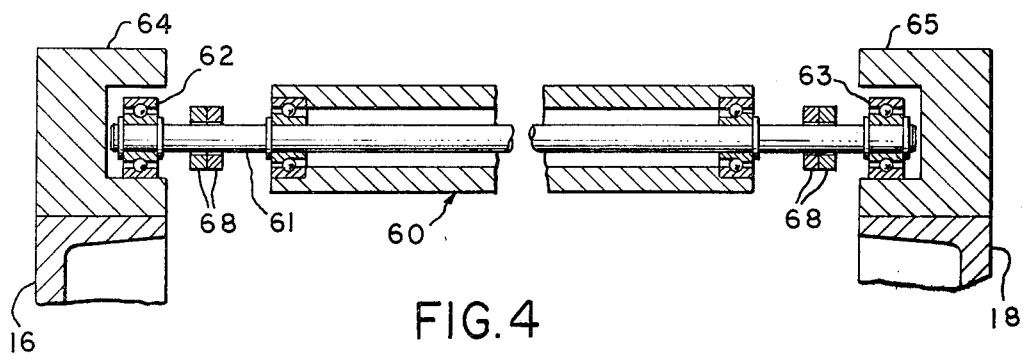
FIGURE 4 is an enlarged sectional view showing details of one of the rollers of the support structure for the flexible band and taken along line 4—4 of FIGURE 1.

The flexible band 25, which serves as the table top on which the material 42 is supported during cutting, is supported by a plurality of rollers 60. As shown in FIGURE 4, each of the rollers 60 is rotatably journaled on its shaft 61. One end of the shaft 61 is rotatably journaled in a roller bearing 62 while its other end is rotatably journaled in a roller bearing 63.

The roller bearing 62 rides in a longitudinal slot in a rail 64, which is secured to the top of the side channel 16. The roller bearing 63 rides in a longitudinal slot in a rail 65, which is connected to the top of the side channel 18.

There are two groups 66 and 67 of the rollers 60. The first group 66 of the rollers 60 has links 68 connecting each end of each of the shafts 61 to each other as shown in FIGURE 3.

The group 66 has the roller 60, which is closest to the carriage 19, attached by the links 68 to upstanding posts 69 on the carriage 19. Thus, the first group 66 of the rollers is attached to one side of the carriage 19.

The second group 67 of the rollers has the shafts 61 of each of the rollers 60 attached to each other by links 70. The group 67 has the roller 60, which is closest to the carriage 19, attached by the links 70 to upstanding posts 71 on the carriage 19 on the opposite side of the carriage 19 from the posts 69. Accordingly, the group 67 of the rollers is attached or connected to the carriage 19 on the side opposite from the connection of the group 66 of the rollers.

As shown in FIGURE 1, the ends of the two groups 66 and 67 of the rollers remote from their connections to the carriage 19 have their terminal links 68 and 70 connected to each other by resilient means such as springs 72. As shown in FIGURE 2, one of the springs 72 is disposed beyond each end of the rollers 60 to connect the links 68 and 70 to each other. The springs 72 provide the desired tension to insure that the groups 66 and 67 are moved together.

The rollers 60, which are supported by the rails 64 and 65 at any instant, are operable to support the band 25. As shown in FIGURE 1, the uppermost surfaces of the upper rolls 21 and 22 and the operable rollers 60 are disposed in substantially the same horizontal plane.

Since the length of each of the groups 66 and 67 of the rollers must be sufficient to support substantially the entire length of the band 25 when the carriage 19 is at either of its extreme ends of its longitudinal movement, the length of each of the groups 66 and 67 of the rollers is such that the rollers 60, which are not supporting the band 25, must be supported. Accordingly, a guide 73 is attached to one end of each of the side channels 16 and 18, and a guide 74 is secured to the other ends of the side channels 16 and 18. The guide 73 cooperates with the group 66 of the rollers while the guide 74 cooperates with the group 67 of the rollers.

Each of the guides 73 and 74 has an upper curved portion 75, which provides a smooth transition from the horizontal slots of the rails 64 and 65 to a vertical portion 76 of the guides 73 and 74. Each of the guides 73 and 74 has a lower curved portion 77, which smoothly turns the direction of the rollers 60 from the vertical towards the horizontal.

A lower guide 78 is supported by the end plates 12 and 14 and extends therebetween. The lower guide 78 has a curved portion 79, which is secured to the end plate 12, at one end for cooperation with the lower curved portion 77 of the guide 73 to guide the rollers 60 of the group 66 from the vertical portion 76 of the guide 73 to a horizontal portion 80 of the lower guide 78.

The guide 78 has a curved portion 81, which is secured to the end plate 14, at its other end. The curved portion 81 cooperates with the lower curved portion 77 of the guide 74 for guiding the rollers 60 of the group 67 from the vertical portion 76 of the guide 74 to the horizontal portion 80 of the lower guide 78.

As shown in FIGURE 1, the rollers 60 are directly supported on the guides 73, 74, and 78. Thus, the ball bearings 62 and 63 of the shafts 61 do not support the rollers 60 on the guides 73, 74, and 78. The ball bearings 62 and 63 support the rollers 60 only when the rollers 60 are operable to support the band 25.

Considering the operation of a material cutting machine using the support structure of the present invention, the longitudinal movement of the carriage 19 to the left (as viewed in FIGURE 1) will pull more of the rollers 60 of the group 67 into operable engagement with the band 25 by supporting their roller bearings 62 and 63 on the rails 64 and 65 and remove the same amount of the rollers 60 of the group 66 from operable engagement with the band 25 through removing their bearings 62 and 63 from support by the rails 64 and 65. The springs 72 insure that the rollers 60 of the group 66 follow the movement of the rollers 60 of the group 67 as the rollers 60 of the group 67 are pulled upwardly for support on the rails 64 and 65.

Likewise, when the carriage 19 is moved to the right (as viewed in FIGURE 1) by rotating the motor 50 in the opposite direction, more of the rollers 60 of the group 66 are pulled onto the rails 64 and 65 to provide support to the band 25. At the same time, the same number of the rollers 60 of the group 67 are removed from support by the rails 64 and 65. As previously mentioned, the springs 72 insure that the rollers 60 of the second group 67 are removed in the same number from the support by the rails 64 and 65 as the rollers 60 of the group 66 are moved onto the rails 64 and 65 for support thereby.

While the cutting blade 35 has been described as being circular and formed with barbs on its periphery, any other type of suitable cutting blade may be employed. For example, any of the cutting blades shown and described in the copending patent application of George W. Sederberg for "Material Cutting Machine Having Reciprocating Cutting Blade," Ser. No. 636,965, filed May 8, 1967, and assigned to the same assignee as the assignee of the present application could be employed.

An advantage of this invention is that heavy loads may be supported on a moving aperture table. Another advantage of this invention is that there is no interference between the support rollers for the flexible band and the longitudinally movable carriage, which supports the cutting means.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An apparatus comprising:
   a frame;
   a flexible band carried by said frame;
   a carriage mounted on said frame for movement longitudinally along said frame relative to said band, at least a portion of said carriage extending below said band;
   support means carried by said frame and operable to engage said band to support said band;
   and means to mount said support means for movement of all of said support means with any movement of said carriage.

2. The apparatus according to claim 1 in which said support means supports at least the portions of said band extending between said carriage and adjacent each end of said frame.

3. An apparatus comprising:
   a frame;
   a flexible band carried by said frame;
   a plurality of spaced support members carried by said frame and operable to engage said band to support said band;
   a carriage mounted on said frame for movement longitudinally along said frame relative to said band, at least a portion of said carriage extending below said band;
   means connecting said support members to each other;
   and means to attach one end of said connecting means to one side of said carriage and the other end of said connecting means to the other side of said carriage.

4. The apparatus according to claim 3 in which said connecting means has resilient means disposed substantially halfway between its ends connected to said carriage.

5. The apparatus according to claim 3 in which:
   each of said support members is a roller having opposite ends of its shaft supported by said frame when said roller is operable to support said band;
   said rollers comprising first and second groups of rollers with said first group extending from said one side of said carriage and said second group extending from said other side of said carriage;
   each of said groups of rollers having a sufficient length to support substantially the entire length of said band when said carriage is at either of its extreme longitudinal positions with respect to said frame;
   and said connecting means includes:
      first link means connecting each end of adjacent shafts of said first group of said rollers to each other;
      second link means connecting each end of adjacent shafts of said second group of rollers to each other;
      and resilient means connecting said first and second link means to each other remote from said attaching means.

6. The apparatus according to claim 5 including means on said frame to support each of said rollers when said roller is inoperable to support said band.

7. The apparatus according to claim 6 in which:
   said support means for said roller when said roller is inoperable to support said band includes:
      a pair of horizontally spaced guides;
      and a third guide disposed beneath said pair of guides and extending longitudinally therebetween.

8. The apparatus according to claim 3 in which:
   said band defines a loop at said carriage;
   and a tool is carried by said carriage between said one side of said carriage and said other side of said carriage, said tool operating on work which is supported by said band and spans said loop of said band at said carriage.

9. The apparatus according to claim 8 in which:
   said carriage has a plurality of rolls mounted thereon;
   and said band is threaded through said rolls to define said loop of said band.

10. The apparatus according to claim 9 in which:
    said plurality of rolls on said carriage includes:
       a pair of horizontally spaced upper rolls;
       and at least one lower roll thereon;
    said band passing over said upper rolls and under said lower roll to define said loop;
    and said tool being disposed between said upper rolls.

11. The apparatus according to claim 5 in which:
    said carriage has:
       a pair of horizontally spaced upper rolls;
       and at least one lower roll thereon;
    said band passing over said upper rolls and under said lower roll to define a loop at said carriage;
    said upper rolls and said operable rollers having their uppermost surfaces in substantially the same horizontal plane;
    said upper rolls being disposed closer to each other than said attaching means;
    and a tool is carried by said carriage and extends between said upper rolls, said tool operating on work supported by said band and spanning said upper rolls.

References Cited

UNITED STATES PATENTS

| | | | |
|---|---|---|---|
| 950,002 | 2/1910 | MacFarland et al. | 269—309 X |
| 3,262,348 | 7/1966 | Wiatt et al. | 83—648 X |

JAMES M. MEISTER, Primary Examiner

U.S. Cl. X.R.

83—647; 269—296, 309

UNITED STATES PATENT OFFICE
CERTIFICATE OF CORRECTION

Patent No. 3,503,295                                    March 31, 1970

James G. Wiatt et al.

It is certified that error appears in the above identified patent and that said Letters Patent are hereby corrected as shown below:

Column 3, line 15, "extends" should read -- extend --.
Column 6, line 17, "second" should be a paragraph and align with "first".

Signed and sealed this 22nd day of December 1970.

(SEAL)
Attest:

Edward M. Fletcher, Jr.                         WILLIAM E. SCHUYLER, JR.
Attesting Officer                                       Commissioner of Patents